United States Patent
Gopalan

(10) Patent No.: US 8,270,540 B2
(45) Date of Patent: Sep. 18, 2012

(54) ACCESS CODE DETECTION AND DC OFFSET-INTERFERENCE CORRECTION

(75) Inventor: Ravikiran Gopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 12/569,803

(22) Filed: Sep. 29, 2009

(65) Prior Publication Data

US 2010/0172442 A1    Jul. 8, 2010

Related U.S. Application Data

(60) Provisional application No. 61/101,669, filed on Sep. 30, 2008.

(51) Int. Cl.
*H04L 27/06* (2006.01)
(52) U.S. Cl. ........................ 375/340; 375/343
(58) Field of Classification Search .............. 375/340, 375/346, 347, 260, 316, 278, 343
See application file for complete search history.

(56) References Cited

U.S. PATENT DOCUMENTS

| | | | |
|---|---|---|---|
| 6,751,273 B1 * | 6/2004 | Park et al. ............... | 375/346 |
| 6,771,720 B1 * | 8/2004 | Yang et al. ............... | 375/345 |
| 2007/0140154 A1 * | 6/2007 | Chun .......................... | 370/311 |
| 2008/0232343 A1 * | 9/2008 | Nguyen et al. ............. | 370/347 |

FOREIGN PATENT DOCUMENTS

| | | |
|---|---|---|
| WO | WO0180508 A2 | 10/2001 |
| WO | WO03024045 A1 | 3/2003 |

OTHER PUBLICATIONS

Alameda E., et al., "Synchronization and DC-Offset estimation for channel estimation using data-dependent superimposed training" 13th European Signal Processing Conference EUSIPCO 2005, Sep. 4, 2005, XP002570473 Antalya Turkey Retrieved from the Internet: URL: http://www.eurasip.org/Proceedings/Eusipco/Eusipco2005/defevent/papers/cr1639.pdf> [retrieved on Feb. 24, 2010] Section 2. Problem Description and Geometrical Interpretation Section 3.1 Training Sequence Synchronization.

International Search Report and Written Opinion—PCT/US2009/058932—ISA/EPO—Mar. 8, 2010.

* cited by examiner

*Primary Examiner* — Emmanuel Bayard
(74) *Attorney, Agent, or Firm* — Stanton Braden

(57) ABSTRACT

A method for detecting an access code in a receiver that does not require an explicit DC-offset interference correction block, comprising:

a) projecting a received signal R onto a subspace orthogonal to the DC;

b) projecting the access code Ci onto the subspace; and c) detecting the presence and location of the access code Ci and eliminating any DC offset therein when the frequency offset f0 in the access code Ci is orthogonal to the subspace, and is therefore nulled out.

20 Claims, 3 Drawing Sheets

ACCESS CODE DETECTION AND DC OFFSET-INTERFERENCE CORRECTION

The present application for a patent claims priority to provisional application No. 61/101,669 entitled "DC-OFFSET IMMUNE ACCESS CODE DETECTION" filed Sep. 30, 2008, and assigned to the assignee hereof and hereby expressly incorporated by reference herein, and relates generally to communication systems, and more specifically to access code detection and DC-Offset interference correction in a wireless communication system.

BACKGROUND

Field

Access code detectors detect the presence of an access code in a received communications signal, and if present, output the location of the access code within the received signal. Access code detectors rely on the output of a correlator crossing a fixed threshold in the presence of the access code. However, a DC offset can cause the output of the correlator to malfunction, i.e., cross the threshold in the absence of an access code and/or cause the output to not cross the threshold in the presence of an access code.

DC offset is an offsetting of a signal from zero, and is the mean amplitude of the waveform so-if the mean amplitude is zero, there is no DC offset. DC offset is undesirable, i.e. a sound that has DC offset will not be at its loudest possible volume when normalized (as the offset consumes headroom), and this problem can extend to the mix as a whole, because a sound with DC offset and a sound without DC offset will have DC offset-when mixed.

For example, when implementing a direct conversion receiver, there is an amount of DC offset on the down converted signal due to filter mismatch and due to self-mixing that occurs with the local oscillator (LO) signal, the radio frequency (RF) signal or interfering signals in the receiver. Filter mismatch due to temperature change over time results in static DC offset. Self-mixing among the LO, RF and interfering signals, as well as reflection at the antenna, temperature variation and LO leakage also result in dynamic DC offset. Correction for DC offset can be performed on the variable gain amplifier (VGA) located in the receiver. Many techniques have been proposed to minimize DC-offset.

Regrettably, one or all of these techniques can only be applied to a system in which the receiver does not continuously operate, such as in a TDMA communication system. In a CDMA system, these techniques will not be effective because the receiver works continuously with no interruption. Also, DC-offset correction using so called "auto-zeroing" techniques during start-up is not practical in a CDMA system because of dynamic offsets. In a CDMA system the only option that shows promise is the implementation of a "servo-loop" like architecture around the variable gain amplifier.

However, in servo-loop architecture, the high pass cut-off frequency is dependent upon the gain characteristics of the variable gain amplifier and the amplifiers in the servo-loop.

Traditionally, access code detectors are preceded by a separate DC-offset correction block. These blocks are often simplistic averaging schemes that rely on known patterns in the transmitted signal.

Therefore, a need exist in the art for an improved access code detection scheme that does not require an explicit DC-offset correction block that will have known patterns in the transmitted signal.

SUMMARY

Embodiments disclosed herein address the above stated needs by utilizing an access code detection scheme that does not require an explicit DC-offset correction block, wherein a received signal is mathematically projected onto a subspace orthogonal to DC, i.e., as an all-one vector. Any received vector affected by a DC-offset is thought of as the required ideal vector corrupted by a scaled, all-one vector
  a) projecting a received signal R onto a subspace orthogonal to the DC;
  b) projecting the access code Ci onto said subspace; and
  c) detecting the presence and location of said access code Ci and eliminating any DC offset therein when the frequency offset f0 in said access code Ci is orthonal to said subspace, and is therefore nulled out.

As such, projecting the received vector onto a sub-space orthogonal to the all-one vector removes the effect of the DC-offset.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The method and apparatus used in advancement of the art provide access code detection and DC-offset correction in a wireless communication system that does not require an explicit DC-offset correction block. A received signal is mathematically projected onto a subspace orthogonal to DC, i.e., an all-one vector. Any received vector affected by a DC-offset is considered or thought of as the required ideal vector corrupted by a scaled, all-one vector. Consequently, projecting this received vector onto a sub-space orthogonal to the all-one vector removes the effect of the DC-offset.

In practice, the received signal is passed through a moving-window projector that projects blocks of the received signal onto the orthogonal sub-space. This projected signal is then correlated against the projected access-code to detect the presence of access code and the location of the access code.

The projector operation is advantageously generic, and does not rely on any known patterns occurring in the access code. Furthermore, the projection may be accomplished using simple circuitry requiring only a moving window accumulator and a fixed multiplier. The projection operation is then followed by a comparator to ensure that the code properties of the access codewords are maintained, thereby eliminating any need for re-calibration of thresholds for the access code detector.

The following exemplary embodiments may replace current access code detectors by eliminating the need for explicit DC-offset correction and can be used with any communications technology.

Problem Setting

Let the transmitted access code be denoted by $Ci \in \{\pm 1\}^{72}$. The received version of this access code is modeled as $R=Ci+Z+f0$ (2.1) where $Z$ is additive noise and $f0$ is the frequency offset. Given a received signal, the objective is to detect the presence and the location of the transmitted access code. Access codes have the property that two codes will differ in at least 14 positions. The access code is viewed as a vector. Therefore, $Ci$ is a vector from $R^{72}$. The access code property now translates as $$E = Ci - Cj : \|E\|_2^2 \geq 4*14 \quad (2.2)$$

Decoding

A received sequence is detected as the access code if and only if the squared error between the received sequence and the access code is within 4*14, i.e., The access code is detected if and only if $$\|R - Ci\|_2^2 < 4*14 \quad (2.3)$$

The distance between two codewords is inversely proportional to the dot product between the codewords which explains why a correlator is an effective means for detecting an access code, i.e., $$\|E\|_2^2 = \|R\|_2^2 + \|Ci\|_2^2 - 2R^\dagger Ci = 4*72 + 4*72 - 2R^\dagger Cr \quad (2.4)$$

Detection Scheme

Figure 1:
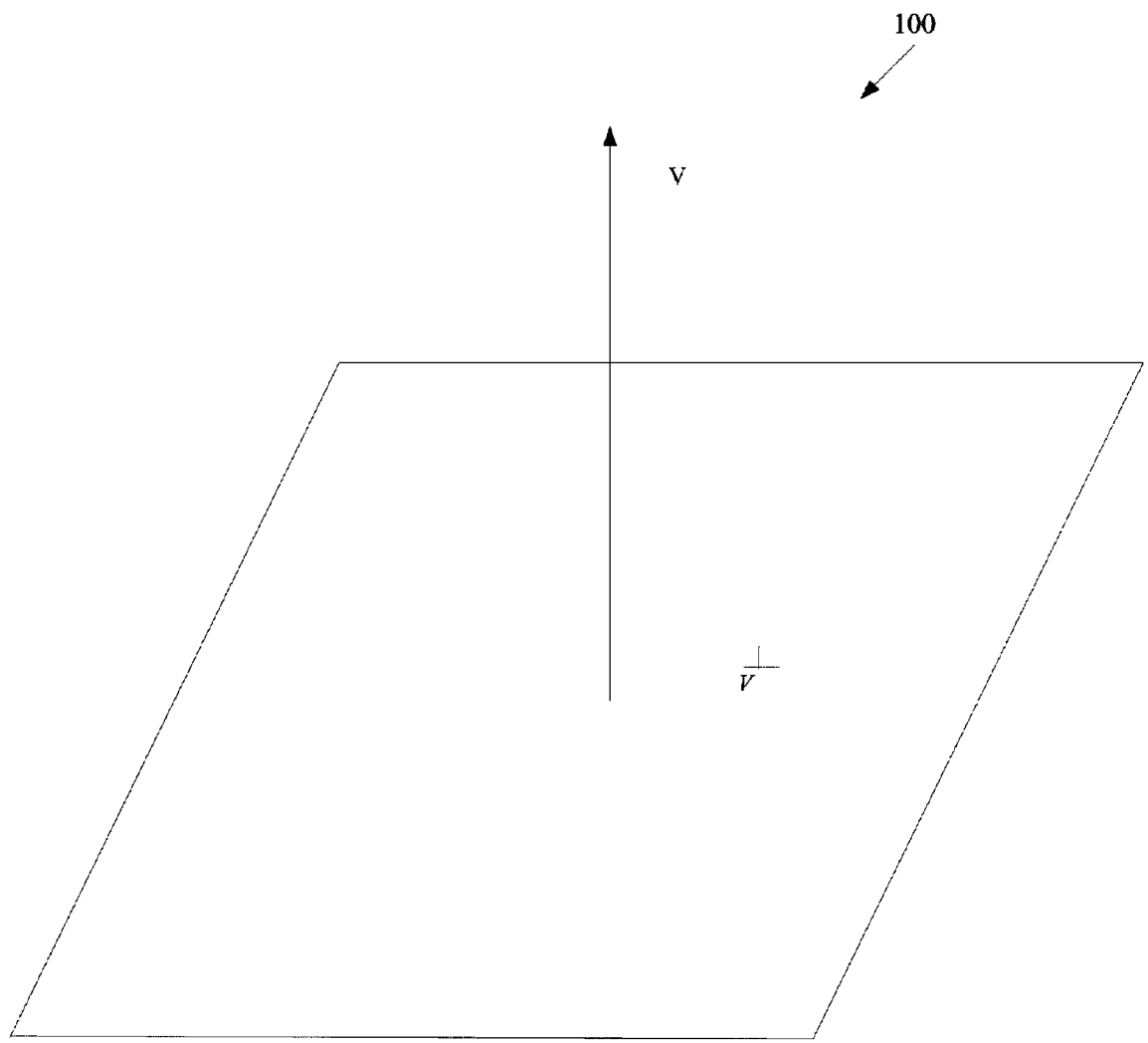
FIG. 1 is a diagram illustrating an exemplary vector and its orthogonal subspace, when considering a n×1 vector V from a n dimensional vector space V from the field F, i.e., V∈$F^n$. The n−1 dimensional subspace $V^\perp$ is the set of vectors perpendicular to the vector V. Therefore, $V^\dagger V^\perp = 0$.

Consider a subspace orthogonal to the all-one vector, as for example in FIG. 1 where there is a diagram illustrating an exemplary vector and its orthogonal subspace, when considering a n×1 vector V from a n dimensional vector space V from the field F, i.e., $V \in F^n$. The n−1 dimensional subspace $V^\perp$ is the set of vectors perpendicular to the vector V. Therefore, $V^\dagger V^\perp = 0$.

The main idea of this scheme is to project both the received signal R and the access code Ci onto this subspace.

Figure 2:
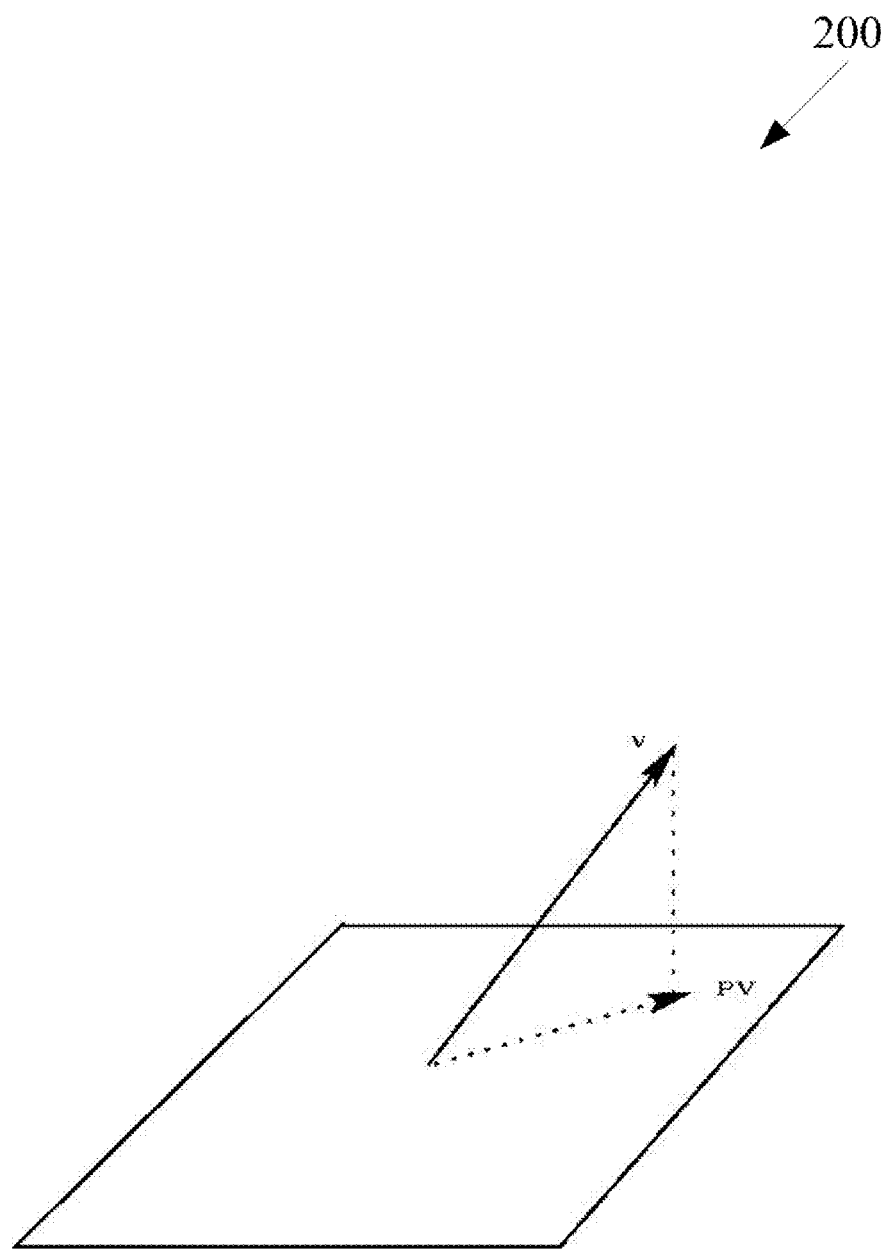
FIG. 2 is a diagram illustrating an exemplary vector V and its projection onto an orthogonal subspace.

The main advantage being that the frequency offset $f0$ is orthogonal to the subspace and is therefore nulled out, as shown by FIG. 2 where there is a diagram illustrating an exemplary vector V and its projection onto an orthogonal subspace.

Let $P^{DC}$ be the orthogonal projector for the subspace orthogonal to the all one vector, i.e., $$P^{DC}(f0[1 1 \ldots 1]^\dagger) = 0 \quad (3.1)$$

Therefore, $$P^{DC}R = P^{DC}Ci + P^{DC}Z \quad (3.2)$$

This projected received signal is now detected against $P^{DC}Ci$.

Figure 3:
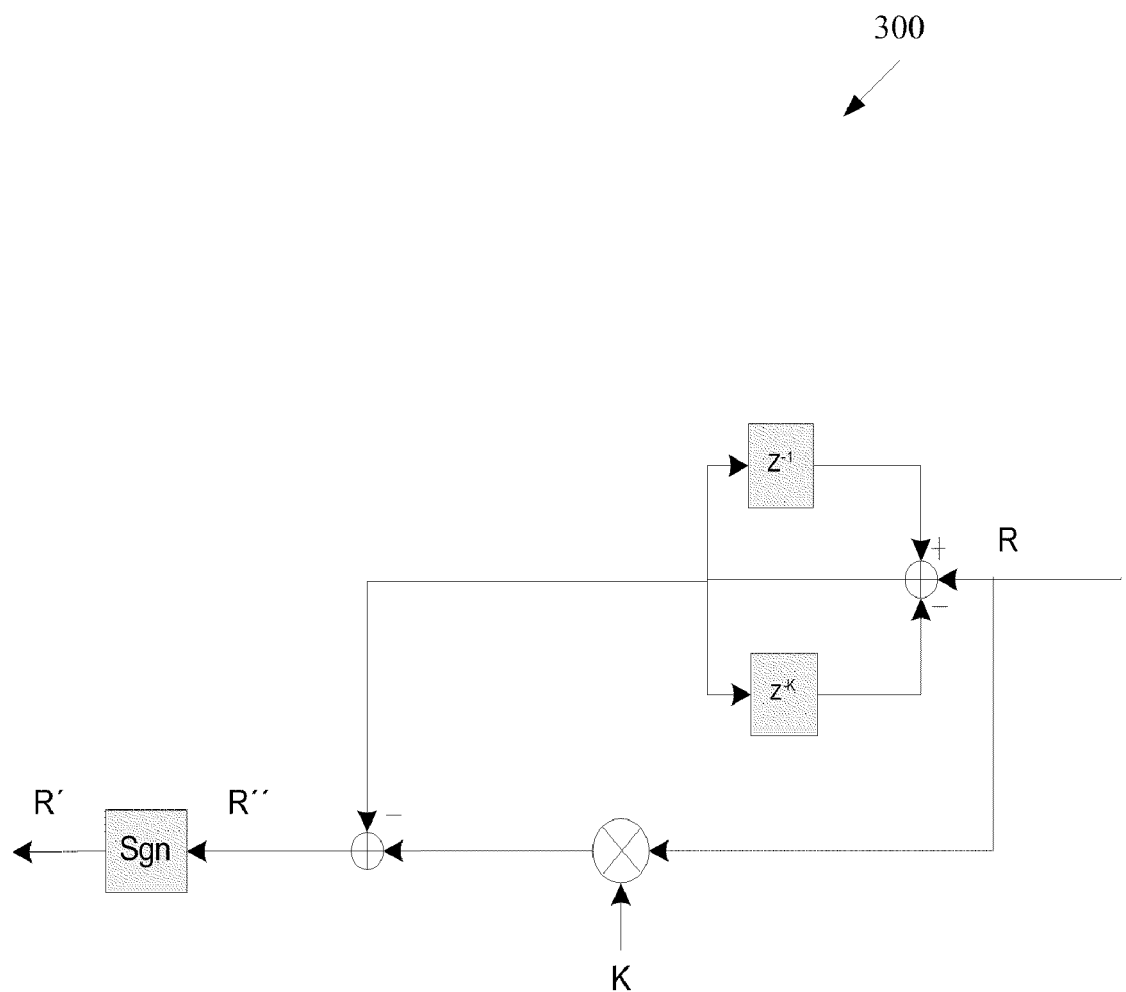
FIG. 3 is an exemplary block diagram of an access code detection and DC-offset correction circuitry to perform operations of projecting the received signal onto an orthogonal subspace and detect the presence and location of an access code.

FIG. 3 is a an exemplary block diagram of Access code detection and DC-Offset correction circuitry performing the following operations to project the received signal onto and orthogonal subspace, and detect the presence and location of an access code.

Let the transmitted access code be $$C_i = [c_i(1) c_i(2) c_i(3) \ldots c_i(K)], \text{ where } c_i(n) \in \{-1, +1\}.$$

The received signal is modeled as $$R = C_i + Z + f_0, \text{ i.e., } r(n) = c_i(n) + z(n) + f_0$$

Z is the additive noise and $f_0$ is the DC offset.

$$r''(n) = Kr(n) - \sum_{n-K-1}^{n} r(k)$$

$$r'(n) = \text{Sgn}\left(Kr(n) - \sum_{n-K-1}^{n} r(k)\right)$$

$$r''(n) = Kr(n) - \sum_{n-K-1}^{n} r(k)$$

$$r'(n) = \text{Sgn}\left(Kr(n) - \sum_{n-K-1}^{n} r(k)\right)$$

$r'(n)$ is the new received signal which is used for regular auto correlation.

If the transformation of the received signal $r(n)$ to the new received signal $r'(n)$ is given by a mapping $r'(n)=f[r(n)]$. The following properties can be readily observed.

Property 1: The transformed codewords $f[C_i]$ have the same distance properties as the original codewords $C_i$.

Proof:

$$C_i = f[C_i]$$

$$f[c_i(n)] = \text{Sgn}\left(Kc_i(n) - \sum_{n-K-1}^{n} c_i(k)\right) = c_i(n)$$

Property 2: The effect of the DC offset is completely eliminated in the new received signal, regardless of the value of the DC offset.

Proof:

$$R' = f[R] = f[R]|_{f_0=0}$$

$$r'_i(n) = \text{Sgn}\left(Kr_i(n) - \sum_{n-K-1}^{n} r_i(k)\right) + z' = f$$

$$[c_i(n)] + f[z(n)] = f[c_i(n)] + z'(n)$$

$$= c_i(n) + z'(n) \text{ (from Property 1)}$$

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

I claim:

1. A method for detecting an access code in a receiver that does not require a DC-offset interference correction block, comprising:
   a) passing a received signal R through a moving-window projector onto a subspace orthogonal to the DC;
   b) projecting through said moving-window projector blocks of the received signal onto an orthogonal sub-space access code Ci;
   c) correlating said projected signal from step b) against a projected access code Ci;
   d) detecting the presence and location of said projected access code Ci and eliminating any DC offset therein when a frequency offset f0 in said access code Ci is orthogonal to said subspace, and is nulled out.

2. The method of claim 1, wherein:
said projected access code is $$C_i = [c_i(1)c_i(2)c_i(3) \ldots c_i(K)], \text{ where } c_i(n) \in \{-1,+1\};$$

the received signal is modeled as $$R = C_i + Z + f_0, \text{ i.e., } r(n) = c_i(n) + z(n) + f_0;$$

Z is the additive noise; and
$f_0$ is the DC offset.

3. The method of claim 2, wherein said access code has the property that two codes will differ in at least 14 positions, and said access code is viewed as a vector from $R^{72}$ and the access code property translates as $E = Ci - Cj: \|E\|^2_2 \geq 4*14$.

4. The method of claim 3, wherein a received sequence is detected as the access code if and only if the squared error between the received sequence and the access code is within $4*14$, and the access code is detected if and only if $$\|R - Ci\|^2_2 < 4*14.$$

5. The method of claim 4, wherein a distance between two codewords is inversely proportional to the dot product between the codewords and a correlator is an effective means for detecting an access code, as follows:

$$\|E\|^2_2 = \|R\|^2_2 + \|Ci\|^2_2 - 2R^\dagger Ci = 4*72 + 4*72 - 2R^\dagger Ci.$$

6. An apparatus for detecting an access code in a receiver that does not require an explicit DC-offset interference correction block, comprising:
   a) means for passing a received signal R through a moving-window projector blocks of the received signal onto an orthogonal sub-space; onto a subspace orthogonal to the DC;
   b) means for projecting through said moving-window projector blocks of the received signal onto an orthogonal sub-space access code Ci;
   c) means for correlating said projected signal from step b) against a projected access code Ci;
   d) means for detecting the presence and location of said projected access code Ci and
eliminating any DC offset therein when a frequency offset f0 in said access code Ci is orthogonal to said subspace, and is nulled out.

7. The apparatus of claim 6, wherein
said projected access code is $$C_i = [c_i(1)c_i(2)c_i(3) \ldots c_i(K)], \text{ where } c_i(n) \in \{-1,+1\};$$

the received signal is modeled as $$R = C_i + Z + f_0, \text{ i.e., } r(n) = c_i(n) + z(n) + f_0;$$

Z is the additive noise; and
$f_0$ is the DC offset.

8. The apparatus of claim 7, wherein said access code has the property that two codes will differ in at least 14 positions, and said access code is viewed as a vector from $R^{72}$ and the access code property translates as $E = Ci - Cj: \|E\|^2_2 \geq 4*14$.

9. The apparatus of claim 8, wherein a received sequence is detected as the access code if and only if the squared error between the received sequence and the access code is within $4*14$, and the access code is detected if and only if $\|R - Ci\|^2_2 < 4*14$.

10. The apparatus of claim 9, wherein a distance between two codewords is inversely proportional to the dot product between the codewords and a correlator is an effective means for detecting an access code, as follows:

$$\|E\|^2_2 = \|R\|^2_2 + \|Ci\|^2_2 - 2R^\dagger Ci = 4*72 + 4*72 - 2R^\dagger Ci.$$

11. A computer readable media having stored thereon computer executable instructions for:
   a) passing a received signal R through a moving-window projector onto a subspace orthogonal to the DC;
   b) projecting through said moving window projector blocks of the received signal onto an orthogonal sub-space access code Ci;
   c) correlating said projected signal from step b) against a projected access code Ci;
   d) detecting the presence and location of said projected access code Ci and eliminating any DC offset therein when a frequency offset f0 in said access code Ci is orthogonal to said subspace, and is nulled out.

12. The computer readable media of claim 11, wherein: said projected access code is $C_i = [c_i(1)c_i(2)c_i(3) \ldots c_i(K)]$, where $c_i(n) \in \{-1,+1\}$;

the received signal is modeled as $R = C_i + Z + f_0$, i.e., $r(n) = c_i(n) + z(n) + f_0$;

Z is the additive noise; and
$f_0$ is the DC offset.

13. The computer readable media of claim 12, wherein said access code has the property that two codes will differ in at least 14 positions, and said access code is viewed as a vector from $R^{72}$ and the access code property translates as $E = Ci - Cj$: $\|E\|_2^2 \geq 4*14$.

14. The computer readable media of claim 13, wherein a received sequence is detected as the access code if and only if the squared error between the received sequence and the access code is within $4*14$, and the access code is detected if and only if $\|R - Ci\|_2^2 < 4*14$.

15. The computer readable media of claim 14, wherein a distance between two codewords is inversely proportional to the dot product between the codewords and a correlator is an effective means for detecting an access code, as follows:

$\|E\|_2^2 = \|R\|_2^2 + \|Ci\|_2^2 - 2R^\dagger Ci = 4*72 + 4*72 - 2R^\dagger Ci$.

16. A remote station apparatus for detecting an access code in a receiver that does not require an explicit DC-offset interference correction block, comprising:
   a) means for passing a received signal R through a moving-window projector onto a subspace orthogonal to the DC;
   b) means for projecting through said moving-window projector blocks of the received signal onto an orthogonal sub-space access code Ci;
   c) means for correlating said projected signal from step b) against a projected access code Ci;
   d) means for detecting the presence and location of said access code Ci and eliminating any DC offset therein when a frequency offset f0 in said access code Ci is orthogonal to said subspace, and is nulled out.

17. The remote station apparatus of claim 16, wherein said projected access code is $C_i = [c_i(1)c_i(2)c_i(3) \ldots c_i(K)]$, where $c_i(n) \in \{-1,+1\}$;

the received signal is modeled as $R = C_i + Z + f_0$, i.e., $r(n) = c_i(n) + z(n) + f_0$;

Z is the additive noise; and
$f_0$ is the DC offset.

18. The remote station apparatus of claim 17, wherein said access code has the property that two codes will differ in at least 14 positions, and said access code is viewed as a vector from $R^{72}$ and the access code property translates as $E = Ci - Cj$: $\|E\|_2^2 \geq 4*14$.

19. The remote station apparatus of claim 18, wherein a received sequence is detected as the access code if and only if the squared error between the received sequence and the access code is within $4*14$, and the access code is detected if and only if $\|R - Ci\|_2^2 < 4*14$.

20. The remote station apparatus of claim 19, wherein a distance between two code words is inversely proportional to the dot product between the code words and a correlator is an effective means for detecting an access code, as follows:

$\|E\|_2^2 = \|R\|_2^2 + \|Ci\|_2^2 - 2R^\dagger Ci = 4*72 + 4*72 - 2R^\dagger Ci$.

* * * * *